(12) United States Patent
Kathuria et al.

(10) Patent No.: US 10,706,069 B2
(45) Date of Patent: Jul. 7, 2020

(54) TECHNIQUES FOR REPLICATION OF A CLIENT DATABASE TO REMOTE DEVICES

(71) Applicant: Facebook, Inc., Menlo Park, CA (US)

(72) Inventors: Vishal Kathuria, Palo Alto, CA (US); Joshua Scott Evenson, Brentwood, CA (US); Andras Biczo, Mountain View, CA (US); Hong-Seok Kim, Bellevue, WA (US); Leigh Jonathan Henry Pauls, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 258 days.

(21) Appl. No.: 15/198,898

(22) Filed: Jun. 30, 2016

(65) Prior Publication Data

US 2018/0004828 A1     Jan. 4, 2018

(51) Int. Cl.
*G06F 16/27* (2019.01)
*G06F 16/23* (2019.01)

(52) U.S. Cl.
CPC .......... *G06F 16/27* (2019.01); *G06F 16/2379* (2019.01)

(58) Field of Classification Search
CPC ......... G06F 17/30575; G06F 17/30377; G06F 16/27; G06F 16/2379; H04L 67/1095; H04L 67/26
USPC .......................................................... 707/620
See application file for complete search history.

(56) References Cited

U.S. PATENT DOCUMENTS

| | | | |
|---|---|---|---|
| 8,825,962 B1 * | 9/2014 | Zhu | H04L 67/26 711/145 |
| 8,862,762 B1 * | 10/2014 | Motrenko | H04L 51/10 709/230 |
| 9,203,923 B2 | 12/2015 | Horel et al. | |
| 10,021,203 B2 | 7/2018 | Papakipos et al. | |
| 2003/0046433 A1 | 3/2003 | Luzzatti et al. | |
| 2003/0096600 A1 | 5/2003 | Lewis et al. | |
| 2004/0177323 A1 | 9/2004 | Kaasila et al. | |
| 2004/0237044 A1 | 11/2004 | Travieso et al. | |
| 2004/0267834 A1 | 12/2004 | Sasaki et al. | |
| 2005/0165858 A1 * | 7/2005 | Tom | G06F 17/30575 |
| 2005/0193010 A1 | 9/2005 | DeShan et al. | |
| 2008/0123686 A1 | 5/2008 | Lee et al. | |

(Continued)

FOREIGN PATENT DOCUMENTS

EP      2587744 A1      5/2013

OTHER PUBLICATIONS

Extended European Search Report for European Patent Application No. 17180048.5, dated Sep. 13, 2017, 11 pages.

*Primary Examiner* — Usmaan Saeed
*Assistant Examiner* — Jessica N Le

(57) ABSTRACT

Techniques for replication of a client database to remote devices are described. In one embodiment, an apparatus may comprise a server database management component operative to receive a collection subscription command from a client device at a database synchronization system, the collection subscription command specifying an object collection; and detect a collection change for the object collection; and an update queue management component operative to register the client device for push notification with a collection update queue associated with the object collection; and add a collection update to the collection update queue, the collection update based on the collection change. Other embodiments are described and claimed.

9 Claims, 15 Drawing Sheets

(56) References Cited

U.S. PATENT DOCUMENTS

| | | | |
|---|---|---|---|
| 2008/0313297 A1 | 12/2008 | Heron et al. | |
| 2009/0293069 A1 | 11/2009 | Yang et al. | |
| 2010/0048231 A1 | 2/2010 | Donald et al. | |
| 2010/0121817 A1 | 5/2010 | Meyer et al. | |
| 2010/0257229 A1 | 10/2010 | Bolohan et al. | |
| 2011/0093500 A1 | 4/2011 | Meyer et al. | |
| 2011/0151837 A1 | 6/2011 | Winbush | |
| 2012/0088527 A1 | 4/2012 | Roka | |
| 2012/0231770 A1 | 9/2012 | Clarke et al. | |
| 2012/0290740 A1* | 11/2012 | Tewari | H04W 4/00 709/248 |
| 2012/0310918 A1* | 12/2012 | Johri | G06F 17/30498 707/714 |
| 2013/0157699 A1 | 6/2013 | Talwar et al. | |
| 2013/0218941 A1* | 8/2013 | Bushin | H04L 67/325 709/201 |
| 2014/0089406 A1* | 3/2014 | Gniffke | H04L 67/147 709/204 |
| 2014/0250062 A1* | 9/2014 | Vroom | G06F 16/273 707/618 |
| 2014/0351217 A1 | 11/2014 | Bostock | |
| 2014/0372375 A1 | 12/2014 | Desai et al. | |
| 2015/0004949 A1* | 1/2015 | Fienberg | H04M 3/42136 455/414.1 |
| 2015/0052144 A1 | 2/2015 | Mari | |
| 2015/0186668 A1* | 7/2015 | Whaley | G06F 16/16 713/156 |
| 2016/0043978 A1 | 2/2016 | Jenkins et al. | |
| 2016/0057156 A1 | 2/2016 | Lin et al. | |
| 2016/0142347 A1 | 5/2016 | Heron et al. | |
| 2016/0294614 A1* | 10/2016 | Searle | G06F 8/654 |
| 2016/0330279 A1* | 11/2016 | Patel | G06F 16/2358 |
| 2017/0024410 A1 | 1/2017 | Pola | |
| 2017/0168802 A1* | 6/2017 | Quinlan | G06F 16/43 |
| 2017/0185573 A1 | 6/2017 | Milvaney | |
| 2017/0193051 A1* | 7/2017 | Ghafourifar | G06F 16/24564 |
| 2017/0277437 A1* | 9/2017 | Jones | G06F 3/0619 |
| 2017/0318123 A1* | 11/2017 | Amrhein | H04L 67/34 |
| 2017/0329555 A1* | 11/2017 | Decker | G06F 3/0604 |

\* cited by examiner

900

Receive a collection subscription command from a client device at a database synchronization system, the collection subscription command specifying an object collection.
902

Register the client device for push notification with a collection update queue associated with the object collection.
904

Detect a collection change for the object collection.
906

Add a collection update to the collection update queue, the collection update based on the collection change.
908

```
┌─────────────────────────────────────────────────┐
│ Send a collection subscription command from a   │
│ client device to a database synchronization     │
│ system, the collection subscription command     │
│ specifying an object collection.                │
│ 922                                             │
└─────────────────────────────────────────────────┘
                        │
┌─────────────────────────────────────────────────┐
│ Receive a collection update from the database   │
│ synchronization system based on the collection  │
│ subscription command, the collection update for │
│ the object collection.                          │
│ 924                                             │
└─────────────────────────────────────────────────┘
                        │
┌─────────────────────────────────────────────────┐
│ Update a local database store for the object    │
│ collection on the client device using the       │
│ collection update.                              │
│ 926                                             │
└─────────────────────────────────────────────────┘
                        │
┌─────────────────────────────────────────────────┐
│ Send an update acknowledgement in response to   │
│ the collection update based on the updating of  │
│ the local database store for the object         │
│ collection.                                     │
│ 928                                             │
└─────────────────────────────────────────────────┘
```

FIG. 9B

TECHNIQUES FOR REPLICATION OF A CLIENT DATABASE TO REMOTE DEVICES

RELATED APPLICATIONS

This application is related to U.S. patent application Ser. No. 14/621,846, titled "Techniques for a Persistent Queue for Message Syncing," filed on Feb. 13, 2015, which is hereby incorporated by reference in its entirety.

This application is related to United States Patent Application Number titled "Techniques for Database Replication Between Client Devices,", filed on Jun. 30, 2016, which is hereby incorporated by reference in its entirety.

BACKGROUND

Mobile devices may run applications, commonly known as "apps," on behalf of their users. These applications may execute as processes on a device. These application may engage in network activity on the mobile device, such as may use wireless signals, including Wi-Fi, cellular data, and/or other technologies.

Cellular carriers may provide cellular data communication to their cellular customers. For example, smart phones and other mobile devices may run web browsers that may be used while on the cellular network to retrieve web pages. Additionally, many applications that may be pre-installed or user-installed on a mobile device may use cellular data communication to access remote data, such as resources available on the Internet.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for database replication between devices. Some embodiments are particularly directed to techniques for database replication between devices using the queued pushing of database state updates. Some embodiments may be directed to techniques for replication of a client database to remote devices. Some embodiments may be directed to techniques for database replication between client devices.

In one embodiment, for example, an apparatus may comprise a server database management component operative to receive a collection subscription command from a client device at a database synchronization system, the collection subscription command specifying an object collection; and detect a collection change for the object collection; and an update queue management component operative to register the client device for push notification with a collection update queue associated with the object collection; and add a collection update to the collection update queue, the collection update based on the collection change. Other embodiments are described and claimed.

In another embodiment, for example, an apparatus may comprise a local database management component operative to send a collection subscription command from a client device to a database synchronization system, the collection subscription command specifying an object collection; and update a local database store for the object collection on the client device using a collection update; and a local queue component operative to receive the collection update from the database synchronization system based on the collection subscription command, the collection update for the object collection, the collection update received as a push notification from the database synchronization system; and send an update acknowledgement in response to the collection update based on the updating of the local database store for the object collection. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 9A illustrates an embodiment of a first logic flow for the system of FIG. 1.

FIG. 9B illustrates an embodiment of a second logic flow for the system of FIG. 1.

DETAILED DESCRIPTION

Figure 1:
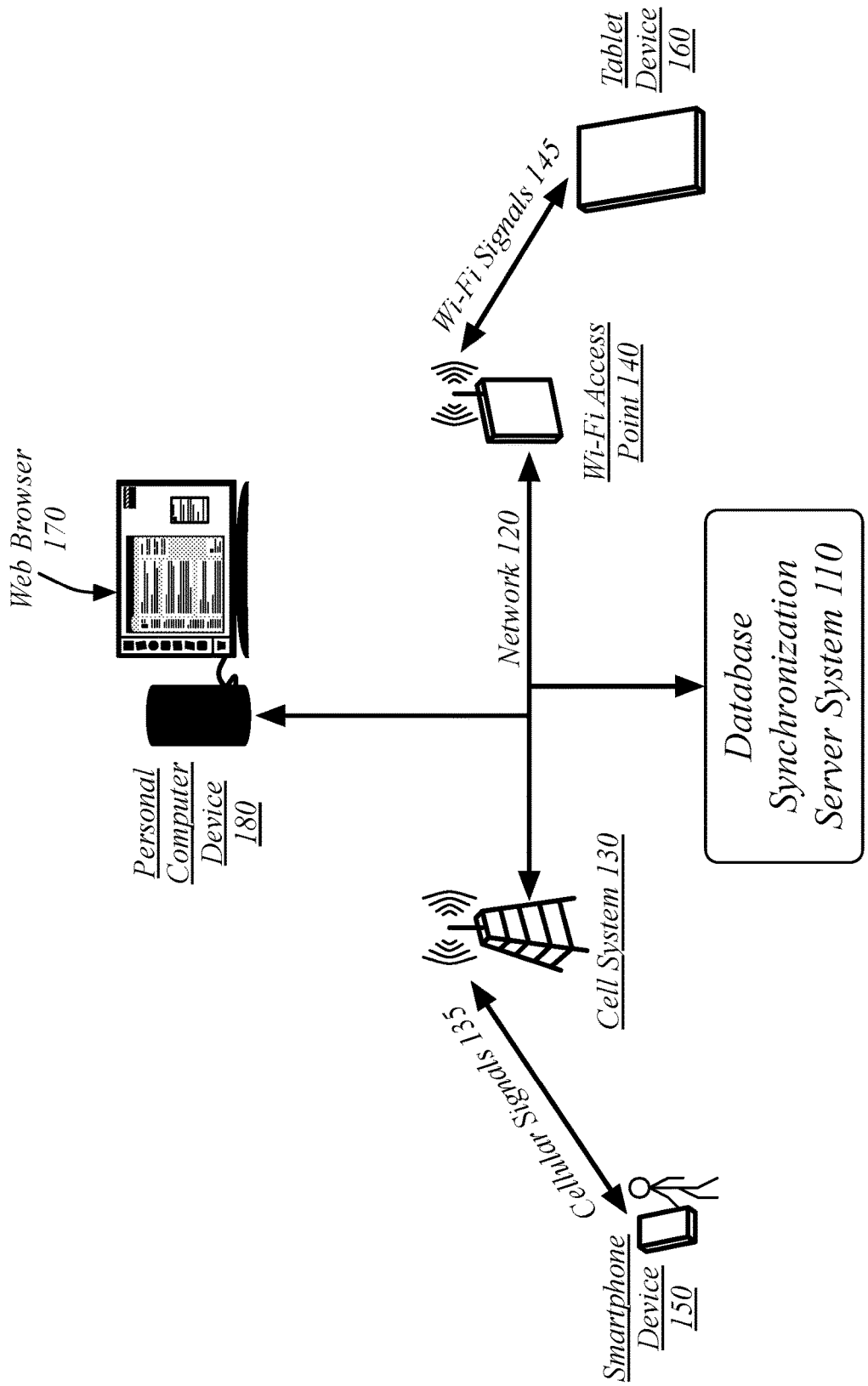
FIG. 1 illustrates an embodiment of a replicated database system.

Applications on a client device may store data locally on the client device in a local data store. An independent local data store may be used by an application that executes independently on a client device. However, some applications may be part of a system across multiple devices. This system may include server devices and other client devices. These applications may benefit from using a data store replicated across the multiple devices.

In one case, a replicated data store may be used to synchronize data between two or more client devices. For example, instances of an application may be installed on two or more client devices. These instances of the application may have their data synchronized using a replicated database, such that a write to the local data store on one client device is copied to the local data store on one or more other client devices. As such, once replication operations have been performed, a read operation on one client device and another client device will retrieve the same data. Replication between client devices used by the same user may serve to provide a consistent experience across multiple client devices for that user. For example, user preferences and other configuration information may be replicated between client devices. This may be convenient both where a user regularly switches between devices and where a user transitions from one device to another. In another example, data may be replicated between client devices used by different users so as to share data between the users.

In another case, a replicated data store may be used to synchronize data between one or more client devices and one or more server devices. For example, an application and a server providing services to the application may have their data synchronized using a replicated database. As such, a write to the local data store on a client device is copied to the data store for the one or more server devices. As such, once replication operations have been performed, a read operation on a client device and a server device will retrieve the same data. Replication between client devices and server devices may serve to synchronize the operations of one or more client devices with the server devices that support it. For example, user preferences set on a client device may configure the operations of both a client device and a server device. Similarly, application configurations set on a server device may configure the operations of the client device. Further, the replication of application data from a client device to a server device may provide a backup of the client data on the server device.

An application on a client device, in particular a mobile client device, may function in a network environment with performance deficits. For instance, a cellular data network may have limited bandwidth available, long round-trip times, and provide unreliable service. Further, a mobile device may have a cellular data allocation. Similarly, a mobile device may have limited power available, which gets used when transmitting or receiving data. As such, the client device may benefit from a replication system that refrains from using mobile data when no data is available for replication. Therefore, the replication system may use a push system in which a server system contacts client devices when additional data is available for replication, with the client devices only reaching out to other devices when local changes to a data store are available for replication on the client devices. As a result, the embodiment can improve the performance of a data store for client devices.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a replicated database system 100. In one embodiment, the replicated database system 100 may comprise a computer-implemented system having software applications comprising one or more components. Although the replicated database system 100 shown in FIG. 1 has a limited number of elements in a certain topology, it may be appreciated that the replicated database system 100 may include more or less elements in alternate topologies as desired for a given implementation.

The database synchronization server system 110 may comprise one or more database synchronization servers operated by a data replication platform as part of the replicated database system 100. A database synchronization server may comprise an Internet-accessible server, with the network 120 connecting the various devices of the replicated database system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the database synchronization server system 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the database synchronization server system 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the database synchronization server system 110.

A messaging client may be a dedicated messaging client. A dedicated messaging client may be specifically associated with a messaging provider administering the messaging platform including the database synchronization server system 110. A dedicated messaging client may be a general client operative to work with a plurality of different messaging providers including the messaging provider administering the messaging platform including the database synchronization server system 110.

The messaging client may be a component of an application providing additional functionality. For example, a social networking service may provide a social networking application for use on a mobile device for accessing and using the social networking service. The social networking service may include messaging functionality such as may be provided by one or more elements of the database synchronization server system 110. It will be appreciated that messaging servers for the database synchronization server system 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage. The messaging endpoint may use a local store that is replicated across multiple devices, which may include one or both of other client devices and server devices.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML code that interacts with the messaging server to present messaging functionality to a user.

A user may save and retrieve data from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox, application configurations, and/or other data kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the database synchronization server system 110 due to it not maintaining or otherwise not having access to an existing state for the message inbox. The web browser 170 may then retrieve incremental updates for any new changes to the state of the message inbox so long as it maintains a user session with the database synchronization server system 110, discarding its known state for the message inbox at the end of the session, such as when the web browser 170 is closed by the user. Without limitation, an update may correspond to the addition of a message to a mailbox, a deletion of a message from a mailbox, and a read receipt.

The database synchronization server system 110 may use knowledge generated from interactions in between users. The database synchronization server system 110 may comprise a component of a social-networking system and may use knowledge generated from the broader interactions of the social-networking system. As such, to protect the privacy of the users of the database synchronization server system 110 and the larger social-networking system, database synchronization server system 110 may include an authorization server (or other suitable component(s)) that allows users to opt in to or opt out of having their actions logged by the database synchronization server system 110 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the database synchronization server system 110 and other elements of a social-networking system through blocking, data hashing, anonymization, or other suitable techniques as appropriate.

Figure 2:
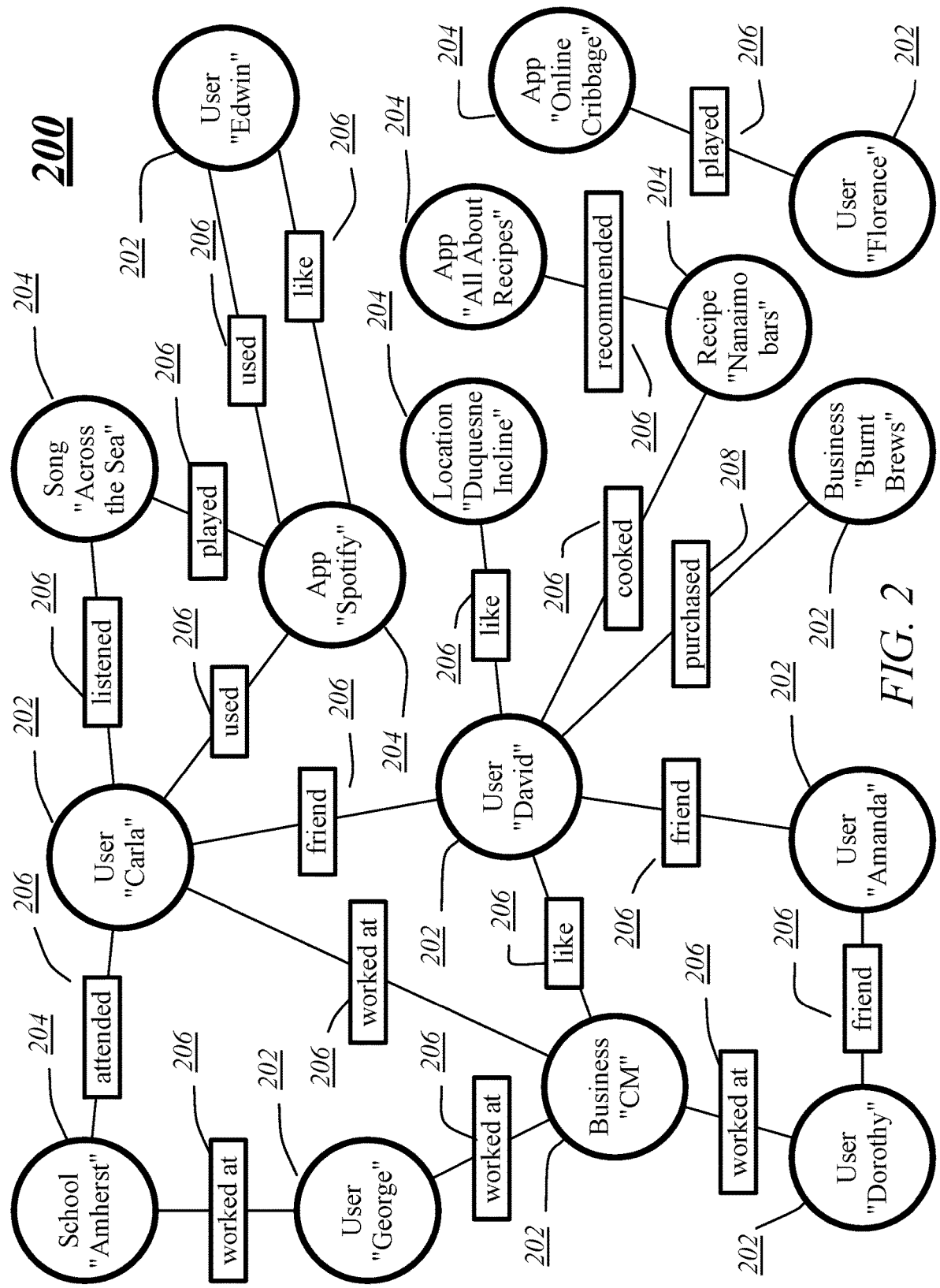
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other interactable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3:
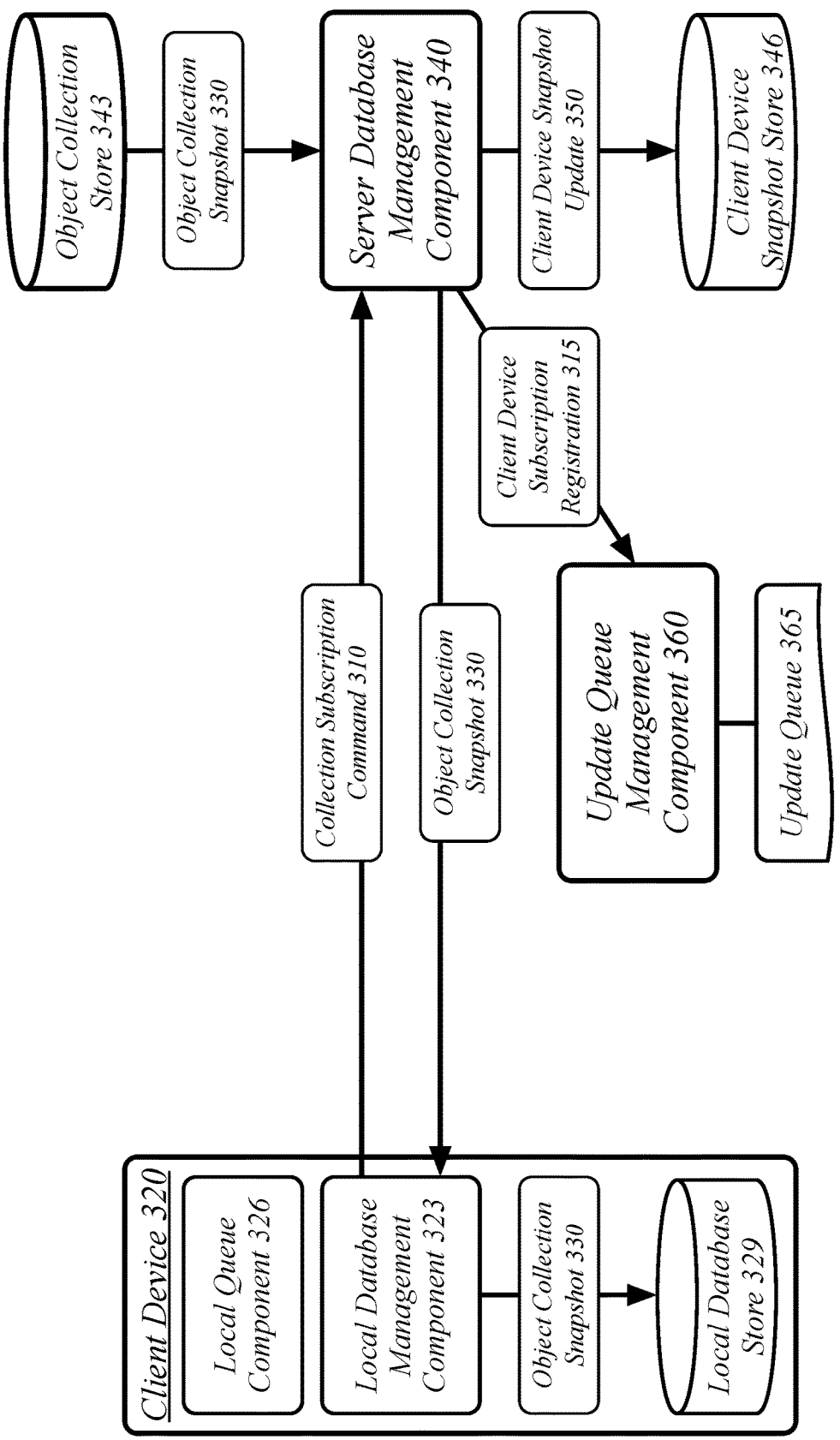
FIG. 3 illustrates an embodiment of the replicated database system processing a collection subscription command.

FIG. 3 illustrates an embodiment of the replicated database system 100 processing a collection subscription command 310.

The replicated database system 100 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a local application.

A client device may communicate with other devices using wireless transmissions to exchange network traffic. Exchanging network traffic, such as may be included in the exchange of messaging or database synchronization transactions, may comprise sending and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and send the network traffic to memory storage accessible to software applications using a network interface application programming interface (API). The network interface controller may be used for the network activities of the embodiments described herein, including the interoperation of the clients and servers through network communication. For example, a client device sending or receiving messages to or from a server may be interpreted as using the network interface controller for network access to a communications network for the sending or receiving of information.

The replicated database system 100 may be operative to replicate a database between multiple devices, such as a client device 320 and one or more other devices, which may include one or more other client devices and/or one or more server devices. The replicated database system 100 may include a database synchronization server system 110 providing transport for the replication of a local client database between devices.

A client device 320 may comprise a local database store 329. The local database store 329 may store application data using database semantics. The local database store 329 may store general application-defined objects using a binary format operative to be used by any application object structure. Objects may be organized into collections, wherein a collection bundles together related objects. Each collection may be identified by a unique collection identifier. Each object may be identified within a collection using one or more keys. The one or more keys may be assigned to an object on writing and used to retrieve the object when reading. An object may be associated with a primary key, wherein the primary key is unique within the collection namespace of a collection. An object may be associated with a sorting key, which may or may not be unique or distinct from other keys. The sorting key may place an ordering on the objects within a collection so as to empower an ordered retrieval of objects within the collection. In some embodiments, a collection may be specified as having one or more object fields to be used as additional sorting values. Where specified, the specified one or more object fields may be used as sorting keys on retrieval. This may be empowered by using a standardized binary format for the representation of an object so that the fields of the object may be read.

An update queue 365 may queue—store and place an ordering on—a plurality of updates. The update queue 365 may comprise a representation of updates in a strict linear order. The update queue 365 may be organized as a data unit according to a variety of techniques. The update queue 365 may be stored in semi-persistent memory, persistent storage, both semi-persistent memory and persistent storage, or a combination of the two. The update queue 365 may be organized according to a variety of data structures, including linked lists, arrays, and other techniques for organizing queues. The update queue 365 may generally comprise a first-in-first-out (FIFO) queue in which no update will be removed or retrieved from the queue before any updates that were received prior to it. The update queue 365 may be managed by an update queue management component 360.

In some embodiments, an update queue 365 may be specifically associated with the user of client device 320, such as by being uniquely associated within the replicated database system 100 with a user account for the user of client device 320. The update queue 365 may be a single queue used for all client devices used by this user. In these embodiments, each user of the replicated database system 100 may have an update queue associated with their account, this update queue used to send updates to one or more client devices for that user. These updates may include database replication updates, messaging updates, and/or any other type of updates.

In some embodiments, an update queue 365 may be specifically associated with a particular object collection. The update queue 365 may be a single queue used for all client devices with a local store for the object collection. This may include both multiple client devices for a single user and multiple client devices associated with multiple different users of the replicated database system 100. In these embodiments, each object collection replicated by the replicated database system 100 may have an update queue associated with it, this update queue used to send updates to one or more client devices for one or more users of the replicated database system 100. These updates may include database replication updates, messaging updates, and/or any other type of updates. As such, in some cases, a plurality of client devices may be subscribed to the collection update queue 365, where two or more client devices of the plurality of client devices are associated with distinct user accounts for the database synchronization system.

In some cases, an object collection associated with a single user account and, as such, other user accounts distinct from the single user account may be prevented from subscribing to the collection update queue 365 for the object collection. Such a private object collection may be used for the storage of private user data, for instance. Server devices may still be permitted to subscribe to the object collection, such as to provide replication between client devices for the single user account and backup of the user data. However, a private object collection may be protected from some portions of data sharing within the data synchronization system, such as data mining or other data analysis, so as to protect the privacy of the user data. In other cases, such as where a single-user object collection is used for user-specific configuration settings, that are not private data of the user, data access with the data synchronization system may be performed as normal.

The client device 320 may comprise a plurality of components. The components may comprise elements of a local application executing on the client device 320. The local application may comprise, without limitation, a messaging application and/or a social-networking application. In some embodiments, the database replication may be performed for a local database store 329 exclusively used by the local application of which the components are an element. In other embodiments, the database replication may be performed for a local database store 329 used by a plurality of applications on the client device 320.

The client device 320 may comprise a local queue component 326. The local queue component 326 may be generally arranged to manage a local incoming queue and a local outgoing queue of updates arriving at and leaving, respectively, the client device 320. The local queue component 326 may receive updates from the update queue 365 and add updates to the update queue 365.

The client device 320 may comprise a local database management component 323. The local database management component 323 may be generally arranged to provide read and write access to the local application comprising the local queue component 326 and local database management component 323 and/or to other local applications using the local database store 329 and replicated database system 100. The local database management component 323 may perform interactions with the servers of the replicated database system 100 other than the performance of queue operations.

The local database management component 323 may send a collection subscription command 310 from the client device 320 to a database synchronization system. The collection subscription command 310 specifies an object collection, the collection subscription command 310 a request to subscribe the client device 320 for replication of the object collection.

In some cases, the object collection may be an object collection originated on the client device 320, in which case the collection subscription command 310 is a request to replicate the object collection from the client device 320 to other devices—though those other devices may still make changes that are replicated back to the client device 320. The collection subscription command 310 may prompt the uploading of a recently created object collection to the database synchronization system. In these cases, the collection subscription command 310 may be performed in response to the local creation of the object collection by an application on the client device 320.

In other cases, the object collection may be an object collection already stored on other devices, in which case the collection subscription command 310 is a request to receive a copy of the object collection from the database synchronization system. The client device 320 may then modify the object collection and have its changes replicated to other devices. The collection subscription command 310 instructs the database synchronization system to push changes to the object collection to the client device 320.

In some embodiments, the database synchronization system comprises a database synchronization server system 110 and a request to the database synchronization system may comprise a request to the servers of the database synchronization server system 110. In other embodiments, the database synchronization system may be a peer-to-peer client system and a request to the database synchronization system may comprise a peer-to-peer request to other devices between which the local database store 329 is replicated.

A database synchronization server system 110 may comprise a server database management component 340. The server database management component 340 may be generally arranged to coordinate synchronization operations with the local database management component 323 and the servers of the database synchronization server system 110. A database synchronization system may receive the collection subscription command 310 from the client device 320 at the server database management component 340, the collection subscription command 310 specifying the object collection the client device 320 is to be subscribed to. The server database management component 340 may send a client device subscription registration 315 to an update queue management component 360 to register the client device 320 for push notification with a collection update queue 365 associated with the object collection.

The server database management component 340 may also provide a current or recent state for the object collection to the client device 320. The server database management component 340 may retrieve an object collection snapshot 330 from an object collection store 343. The object collection store 343 may store the current or a recent state for all of the object collections supported by the replicated database system 100. In many cases, the object collection store 343 will store the most recent state for the object collections. However, in some cases, some update may still be in transit, such as in a local queue on a client device or in an update queue and not yet retrieved by the server database management component 340 and stored in the object collection store 343.

The server database management component 340 may retrieve an object collection snapshot 330 for the object collection in response to the collection subscription command 310. The object collection snapshot 330 embodies the current or recent state for the object collection. The server database management component 340 may then send the object collection snapshot 330 for the object collection to the client device 320. The local database management component 323 received the object collection snapshot 330 from the database synchronization system in response to the collection subscription command 310 and stores the object collection snapshot 330 in the local database store 329.

The server database management component 340 may determine that the object collection is non-persisted in response to the collection subscription command 310. A non-persisted object collection may be one marked for non-persistence by either a client device or the server system. The server database management component 340 may generate an empty object collection snapshot 330 and send the empty object collection snapshot 330 for the object collection to the client device 320, rather than retrieve a non-empty object collection snapshot 330, in response to determining that the object collection is non-persisted.

In some cases, such as where an object collection is particularly large, only a portion of the object collection may be stored on a client device 320. The server database management component 340 may determine that a size for the object collection exceeds a predefined threshold and generate the objection collection snapshot 330 as a partial snapshot of the object collection in response to determining that the size for the object collection exceeds the predefined threshold and transmit the partial object collection snapshot 330 to the client device 320.

The client device 320 may retrieve an object collection during an initial run of an application as part of initializing the application on the client device 320. The local database management component 323 may contribute to the performance of an initial setup of an application on the client device by sending the collection subscription command as part of the initial setup. This object collection for the collection subscription command 310 may be preferences object collection for the application. The local database management component 323 may receive a preferences object collection snapshot 330 in response to the collection subscription command 310, store the preferences object collection snapshot 330 in the local database store 329, and configure the application according to the preferences object collection snapshot 330. This may be used to send server-configured configuration options to the client device 320 to configure the application for interaction with server devices. This may be used to send user-configured configuration options to the client device 320 to replicate user-configured options from one client device to another, such as a new device. In some cases, such as where an the object collection is associated with system-side settings for the client device 320, an object collection may be a user-read-only object collection in which the local database management component 323 prevents local writing of the objects in the object collection.

In some cases, such as where a new user is being configured for user with a system, a requested object collection for subscription may not be available at the time it is requested. The server database management component 340 may determine that the object collection is a non-existing object collection and create the object collection in response. This creation of the object collection may be performed in conjunction with other registration processes for a new user. Where the update queue 365 is associated with this particular object collection, the server database management component 340 may instruct the update queue management component 360 to create the associated collection update queue 365 as well.

A client device 320 may also unsubscribe itself from an update queue 365. The local database management component 323 may transmit a collection unsubscription command to the server database management component 340. The server database management component 340 may receive the collection unsubscription command from the client device 320, the collection unsubscription command specifying the object collection, and deregister the client device for push notification with the collection update queue 365 associated with the object collection in response to the collection unsubscription command by sending a client device unsubscription command to the update queue management component 360.

A client device snapshot store 346 may store a copy of the local data in the local database store 329 for each supported client device. As such, when an object collection snapshot 330 is sent to a client device 320, a client device snapshot update 350 may be performed to update the local copy of the local database store 329 of the client device 320 in the client device snapshot store 346.

Figure 4:
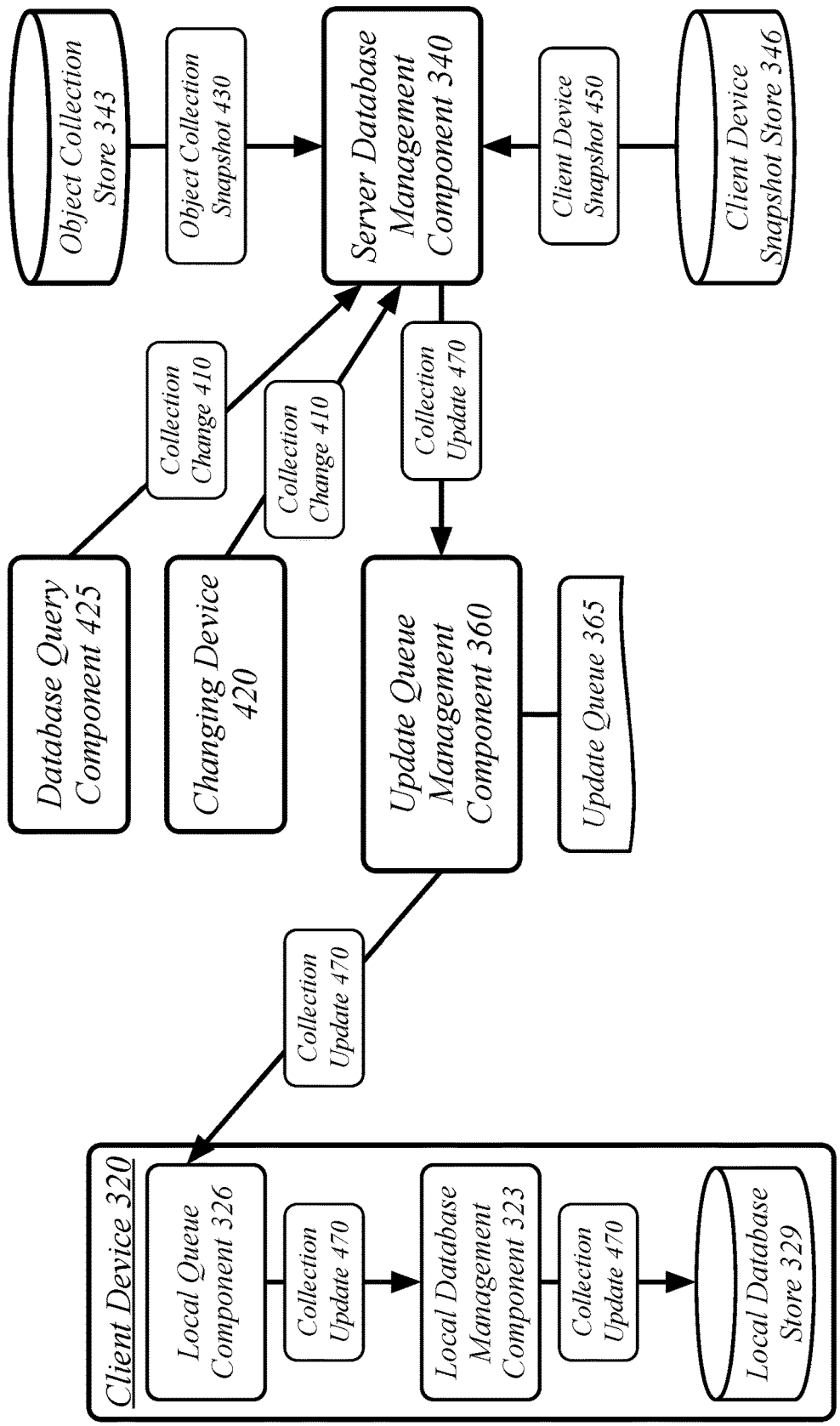
FIG. 4 illustrates an embodiment of the replicated database system communicating a collection update.

FIG. 4 illustrates an embodiment of the replicated database system 100 communicating a collection update 470.

The server database management component 340 may detect a collection change 410 for the object collection and add a collection update 470 to the collection update queue 365. This collection update 470 is based on the collection change and may encapsulate the difference in the object collection created by the collection change 410 in a smaller form. While a collection change 410 may be a complete specification of an object in the object collection, the collection update 470 may be a diff (i.e., calculated differential) of the previous version of the object and the version represented in the collection change 410. The collection change 410 modifies the object collection to an updated collection state. The server database management component 340 may retrieve an object collection snapshot 430 for the object collection and generate the collection update 470 based on a difference between the object collection snapshot 430 and the updated collection state.

In some embodiments, a collection update 470 may be specifically created for a particular client device 320, such as where an update queue 365 is specific to a particular user or client device. In these embodiments, the server database management component 340 may retrieve a client device snapshot 450 for the client device 320 and generate the collection update 470 based on a difference between the client device snapshot 450 and the updated collection state.

The update queue management component 360 may queue updates while a client device 320 is not available. For instance, while a client device 320 is turned off or doesn't have an accessible network. When a client device 320 again has network access it may notify the database synchronization system that it is available. The update queue management component 360 may therefore detect that the client device 320 has network accessibility with the database synchronization system and send the collection update 470 to the client device 320 based on a push notification. In some embodiments, the push notification may include the collection update 470. In other embodiments, the push notification may prompt the local queue component 326, upon receiving the push notification, to fetch the collection update 470 (and possibly other updates) from the update queue through communication with the update queue management component 360. The update queue management component 360 may track which updates a client device 320 has downloaded, and may advance a queue cursor for the client device 320 past the collection update 470 in the collection update queue 365 in response to the collection update 470 being sent to the client device 320.

The local queue component 326 may receive the collection update 470 from the database synchronization system based on the collection subscription command 310 having been performed, the collection update for the object collection subscribed by the collection subscription command 310. It will be appreciated that a particular client device 320 may be subscribed to a plurality of object collections and receive collection updates relating to multiple object collections of the plurality of object collections.

The local queue component 326 may pass the collection update 470 to the local database management component 323 which may then update the local database store 329 for the object collection on the client device 320 using the collection update 470. The collection update 470 may be received as a push notification from the database synchronization system and may be retrieved in response to a push notification notifying the local queue component 326 that a collection update 470 is available. The local database management component 323 may write the collection update 470 to the local database store 329 by applying it as a diff to the existing contents of the local database store 329.

In one instance, an object collection may store a contact list for a user account with a messaging system. A collection update 470 may comprise a contact update for the contact list and therefore be used to update the contents of the contact list. The contact update may comprise, for example, an updated profile picture, which may be a particularly common form of change to a contact list. Where a profile picture is changed, the change of the profile picture for the user account may be the only change. Due to the collection update 470 being sent as a diff, only this change to the profile picture may be sent, with the other elements of an object storing a particular user contact being excluded from the collection update 470 by the diff operation due to those other element not being changed by the collection change 410.

A collection update 470 may comprise a version vector. The version vector may place an ordering on the collection updates in an update queue 365. The local database management component 323 may update the local database store 329 for the object collection on the client device 320 using the collection update based on the version vector. In some cases, that may mean discarding a collection update 470 without applying it due to it being outdated according to the version vector.

In some cases, an object collection may include a query object. A query object may be associated with a database query for a database such that it encapsulates the results of the database query. In some embodiments, an object collection may collectively comprise the results of the database query, such that the object collection is defined by a database query with each result of the database query being an object in the object collection and each object in the object collection being a result of the database query. The initial object collection snapshot 330 provided to a client device 320 may be the results of a query according to the database query performed by a database query component 425. The database query component 425 may perform a database query to generate the object collection snapshot 330 for the object collection in response to the collection subscription command 310 and the server database management component 340 may then send the object collection snapshot 330 for the object collection to the client device 320.

The subscription to the object collection may subscribe the client device 320 to updated results to the database query. In some cases, a database query may be performed periodically by a database query component 425, such as on a defined schedule. In some cases, hooks may be placed in the database so as to prompt a notification to the server database management component by the database query component 425 when the database changes so as to change the results of the database query. Various techniques may be used. In some cases, a queried database may store a social graph 200 for a social networking service, with the database query results being the results of a social graph search or other retrieval from the social graph. The database query component 425 may detect a collection change 410 for the object collection based on a performance of the database query against the database and provide the collection change 410 to the server database management component 340.

Figure 5:
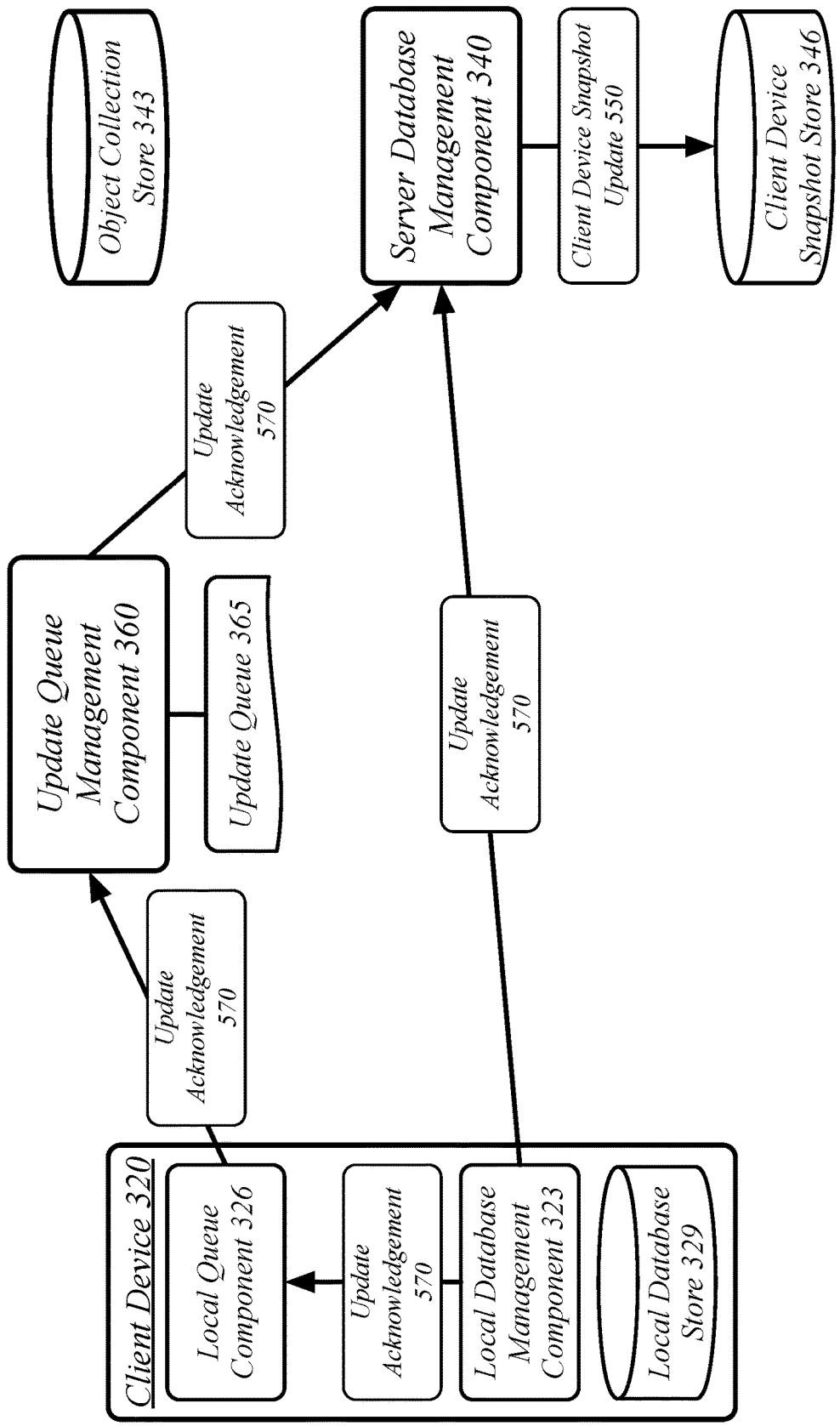
FIG. 5 illustrates an embodiment of the replicated database system processing an update acknowledgement.

FIG. 5 illustrates an embodiment of the replicated database system 100 processing an update acknowledgement 570.

The local database management component 320 may send an update acknowledgement 570 in response to the collection update 470 based on the updating of the local database store 329 for the object collection. In some embodiments, once the local database management component 323 has applied the collection update 470, the local database management component 323 may send an update acknowledgement 570 directly to the server database management component 340. In other embodiments, the update acknowledgement 570 may be added to the update queue 365 by the local queue component 326 acting in conjunction with the update queue management component 360 and thereby sent to the server database management component 340 via the update queue 365. The server database management component 340 may perform a client device snapshot update 550 with the client device snapshot store 346 to mark that the collection update 470 has been received and stored by the client device 320.

Figure 6:
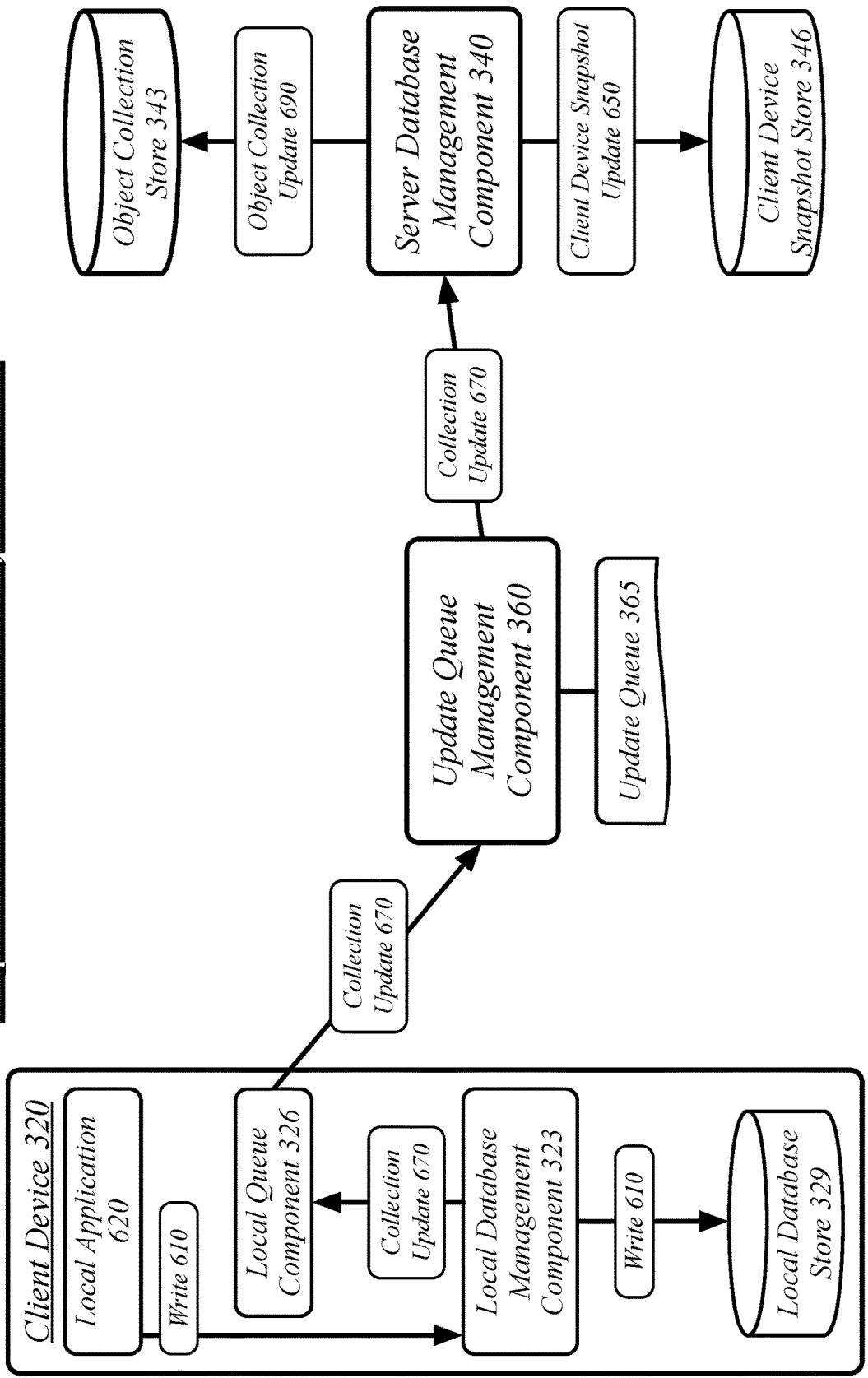
FIG. 6 illustrates an embodiment of the replicated database system processing an application write.

FIG. 6 illustrates an embodiment of the replicated database system 100 processing an application write 610.

A local application 620, which may comprise the local queue component 326 and local database management component 323 or may be a distinct application, may perform a write 610 to the local database store 329. The local database management component 323 may receive a write command from a local application 620 on the client device 320. This write command may specify the object collection to be written to, such as using a collection identifier. The write command may comprise an application object to be written. The write command may comprise one or more keys with which to lookup the application object, such as a primary key for the application object and a sort key for the application object.

The local database management component 323 may store the application object in the local database store 329 in response to the write command. The local database store 329 may thereafter be operative to empower the local application 620 to retrieve the application object based on either of the primary key for the application object or the sort key for the application object. The application object may be stored in the local database store 329 as a binary representation of the application object.

In one case, an application object may comprise a user-to-user message for a messaging system. The primary key may comprise a message identifier for the user-to-user message, such as a unique message identifier within a namespace for the messaging system. The sort key may comprise a timestamp for the user-to-user message, so that messages may be retrieved in timestamp order using the sort key.

In some instances, additional objects are added to the local database store 329. The local database management component 323 may detect that the object collection lacks an existing object with the primary key in the local database store 329 and add the application object to the local database store 329 as an additional object associated with the object collection.

In other instances, existing objects are replaced in the local database store 329. The local database management component 323 may detect that the primary key corresponds to an existing object for the object collection in the local database store 329 and replace the existing object with the application object for the object collection in the local database store 329.

The local database management component 323 may then generate a diff based on the write 610. Where the write 610 is for an additional object to be added to the local database store 329, the diff will be the entire additional object. Where the write 610 is a replacement for an existing object in the local database store 329, this diff will be only the changed portion(s) of the existing object.

The update queue management component 360 may receive the collection update 670 and add the collection update 670 to the update queue 365 for the client device and/or object collection. In some embodiments, the update queue management component 360 may send a collection update queuing acknowledgement to the client device 320 in response to adding the collection update to the collection update queue 365 for the object collection. This acknowledgement may be recorded in the local database store 329 and may be provided to the local application 620. This may be used so that, for example, the local application 620 may visually indicate (e.g., by displaying an acknowledgement symbol) to the user that the information embodied in the write 610 has been received by the database synchronization system.

The server database management component 340 may then retrieve the collection update 670 associated with an object collection via the collection update queue 365 for the object collection. The server database management component 340 may then update an object collection store with the collection update 670 via an object collection update 690 by applying the diff stored within the collection update 670 to the object collection store 343. A client device snapshot update 650 may also be performed with the client device snapshot store 346 to store the update to the local database store 329 of the client device 320. The server database management component 340 may then send a collection update storage acknowledgement to the client device 320 in response to updating the object collection store 343 with the collection update. This may be used so that, for example, the local application 620 may visually indicate (e.g., by displaying an acknowledgement symbol) to the user that the information embodied in the write 610 has been written to the object collection store 343.

Figure 7:
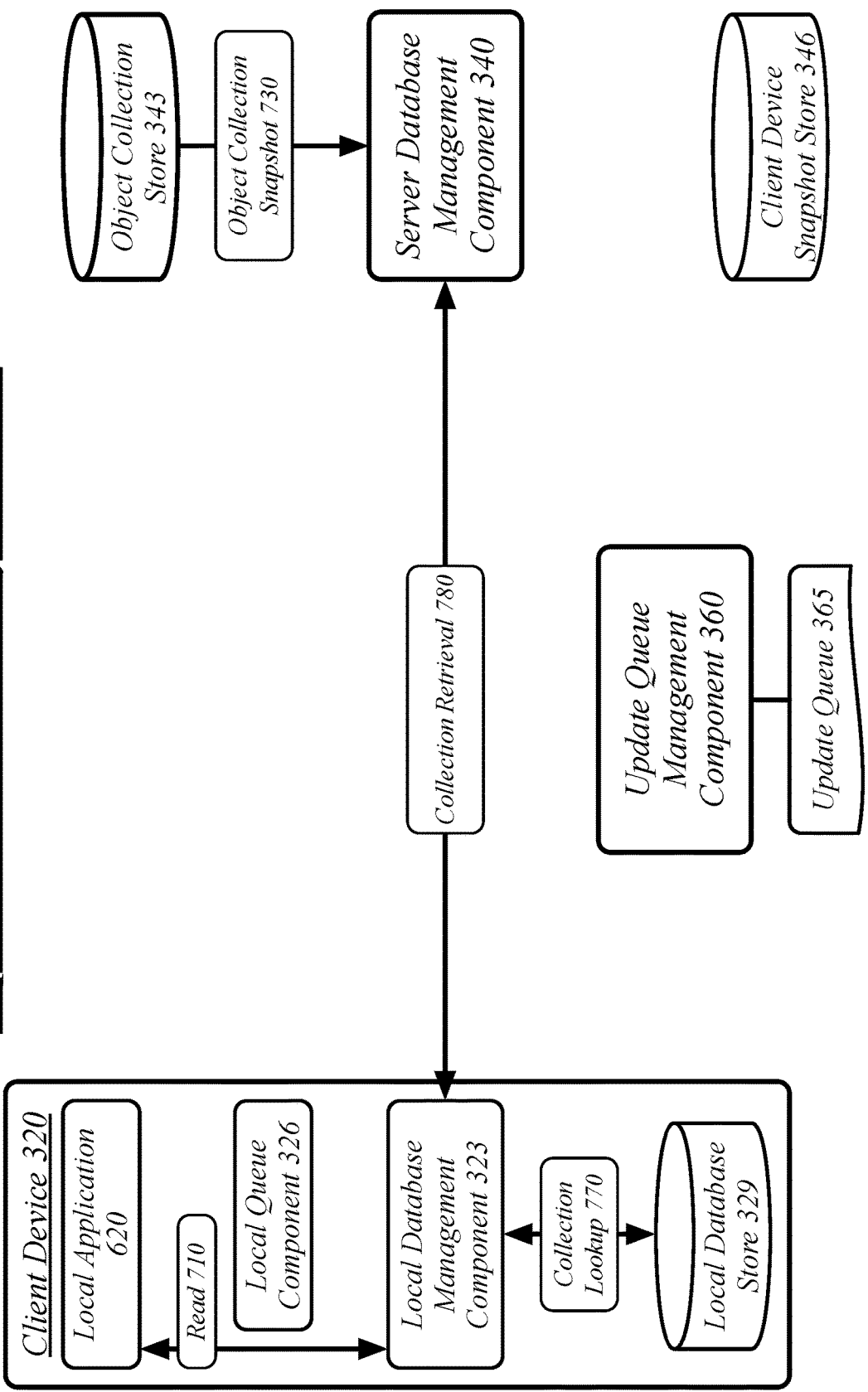
FIG. 7 illustrates an embodiment of the replicated database system processing an application read.

FIG. 7 illustrates an embodiment of the replicated database system 100 processing an application read 710.

The local database management component 323 may receive a read command from a local application 620 on the client device 320. The read command may specify the object collection and a key for use in performing a collection lookup 770.

In some cases, the read command may specify a primary key, the primary key a unique identifier for an application object within a namespace for the object collection. The local database management component 323 may then retrieve the application object based on the primary key by performing a database lookup using a collection identifier to identify the collection and the primary key to identify the application object within the object collection. The local database management component 323 may then provide the application object to the local application 620.

In other cases, the read 710 may use a sort key. One a read 710 is opened using a sort key, a cursor may be set in the local database store 329 pointing at the object identified by the sort key. This cursor may then be used by the local application 620 to guide the read 710, such as by reading objects forward or backwards from the initial object identified by the sort key, resulting in movement of the cursor corresponding to the read 710.

As such, the local database management component 323 may receive one or more read commands from a local application 620 on the client device 320, the one or more read commands specifying the object collection and a sort key, with the sort key an ordering identifier for an application object within a namespace for the object collection and the one or more read commands specifying a quantity for retrieval. The local database management component 323 may then retrieve a plurality of application objects based on the sort key, an ordering defined by the plurality of assigned sort keys for the plurality of application objects, and the specified quantity. The local database management component 323 may then provide the plurality of application objects to the local application 620 in response to the read 710. These one or more read commands may be based on a cursor for the object collection, with an initial read command establishing the cursor according to the sort key and additional read commands retrieving additional objects through forwards or backwards movement of the cursor through the ordering defined by the sort keys of the objects stored in the object collection.

In some cases, where a large object collection is only partially stored in the local database store 329, the local database management component 323 may perform a collection retrieval 780 in order to retrieve an object requested as part of a read 710. In some instances, the collection retrieval 780 may be based on a primary key. In other instances, the collection retrieval 780 may be based on a sort key. In some embodiments, additional objects beyond those directly requested as part of the read 710 may be retrieved in the collection retrieval 780. For instance, additional objects may be retrieved so as to support a cursor scan based on a sort key in preparation for additional retrievals by the local application 620.

Figure 8:
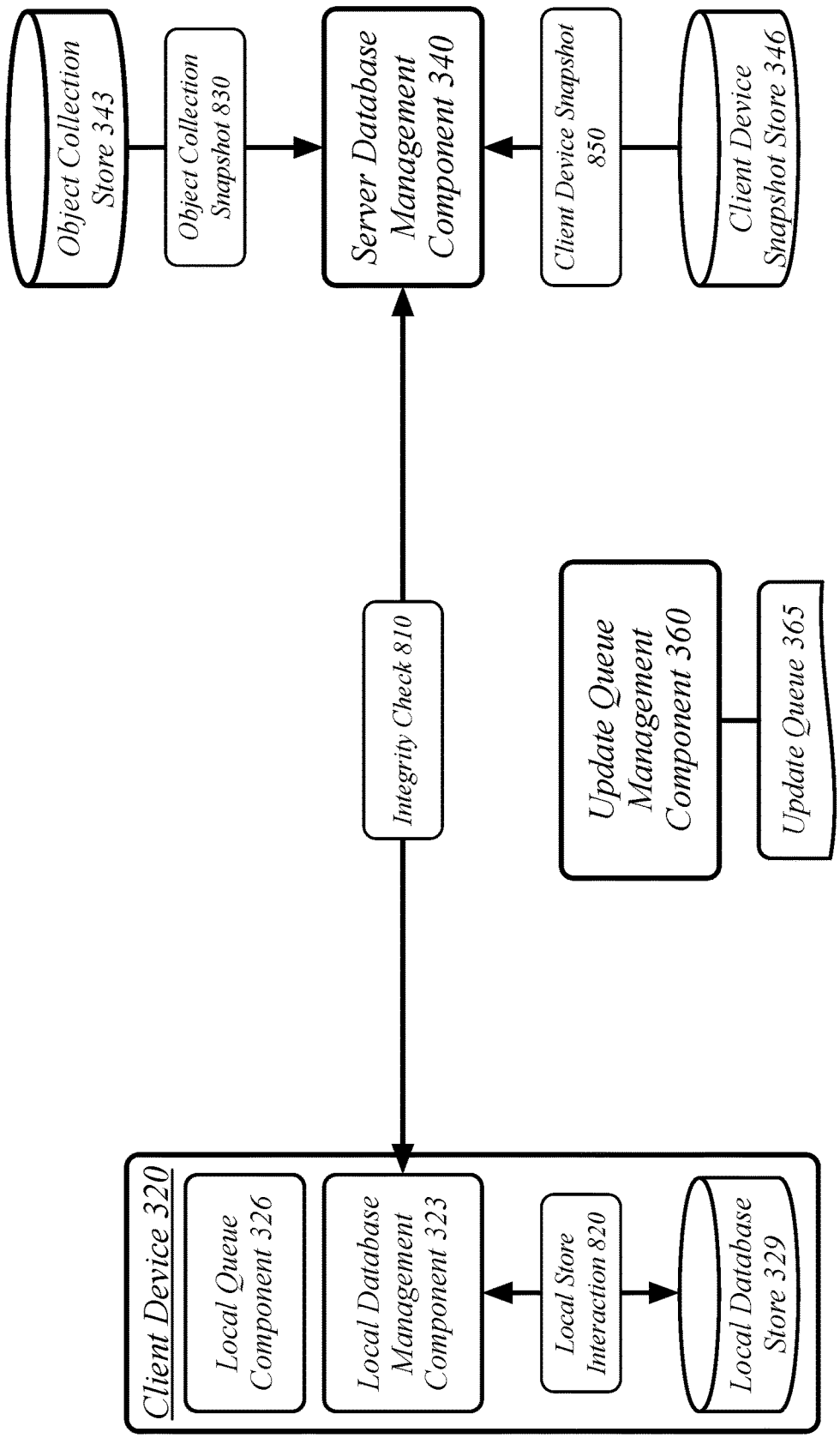
FIG. 8 illustrates an embodiment of the replicated database system performing a device integrity check.

FIG. 8 illustrates an embodiment of the replicated database system 100 performing a device integrity check 810.

While the replicated database system 100 may, in normal operation, maintain consistency between client devices, the client device 320 may periodically perform a periodic integrity check 810 for the local database store 329 with the database synchronization system. This may protect against corruption of the local database store 329 of a client device 320 or other inconsistencies that may develop. A periodic integrity check 810 may be performed in a regular schedule, such as once a day. In some embodiments, the integrity check 810 may bring the client device 320 in line with the object collection store 343 by retrieving an object collection snapshot 830 or a plurality of object collection snapshots and ensuring that the client device 320 is consistent with the object collection snapshot(s). In other embodiments, the integrity check 810 may bring the client device 320 in line with the client device snapshot store 346 by retrieving an client device snapshot 850 and ensuring that the client device 320 is consistent with the client device snapshot 850. The local database management component 323 may perform the integrity check 810 in coordination with the server database management component 340 through a local store interaction 820 with the local database store 329. Various techniques may be used.

In some embodiments, the periodic integrity check 810 may be based on invertible Bloom filters. The local database management component 323 may use an invertible Bloom filter structure that comprises a list of buckets. Each bucket of the list of buckets has a key, wherein each key is a hash of collection objects for an object collection. Each bucket also has a count, which is the number of objects hashed into each bucket. The management component takes each object's primary key and hashes it once to get the object's identifier. That identifier is then hashed multiple times to get the indices of the buckets that the identifier will be put in. The object is put into each bucket by means of performing an XOR (i.e., exclusive or) operating of its identifier into the key field of the bucket and incrementing the bucket's count. This process is then repeated, but with the identifier being a hash of the primary key and the binary representation of the object.

Once this is performed, the local database management component 323 of the client device 320 sends the list of buckets to the server database management component 340 of the database synchronization server system 110. The server database management component 340 may then operate on the list of buckets, based on its record of what it thinks the client should have (e.g., using the client device snapshot 850), in response to receiving the list of buckets from the client device 320.

The server database management component 340 may hash each primary key to get an identifier using the same hash function as used by the local database management component 323 on the client device 320. The server database management component 340 then hashes that identifier to determine which buckets the identifier should go into. The server database management component 340 then performs an XOR of the identifier in that bucket, thereby, if the devices are consistent, reversing the XOR by the client device 320 of that identifier into that bucket. The server database management component 340 then decrements the count for that bucket. This same process is then repeated, but with the identifier being a hash of the primary key and the binary representation (e.g., "blob") of the object. The use of the primary key and the binary representation catches cases in which an object with the primary key is present on both devices, but the object itself is different or has been changed.

Once this process has been performed, then if the client device 320 and the database synchronization server system 110 have the exact same data, then all of the buckets' key fields will be all zeroes and all of the buckets' counts will be zero. The key field will be zero because the key field started as zero, the client applied XOR operations of a series of identifiers, and then server applied XOR operations of the same series of identifiers thereby zeroing out the key fields. Similarly, the count fields will be zero because, if the data is consistent, the same number of identifiers will be matched to each bucket on the client device 320 and the server database management component 340.

However, if the client device 320 and the database synchronization server system 110 have different data, then at least one bucket's key field will not match and the count for at least one bucket may be different. For a bucket with a mismatch, if the count is less than zero (i.e., is negative), the client device 320 has an extra object that must be removed from the client device 320. The server database management component 340 therefore sends an object removal command to the local database management component 323 using the identifier. The local database management component 323 determines the primary key for the object using the identifier and then deletes the object from the local database store 329.

For a bucket with a mismatch, if the count is greater than zero (i.e., is positive), the client device 320 has an object missing from its device that must be sent to the client device 320 by the server database management component 340. The server database management component 340 identifies the primary key for the object using the identifier and then sends the object to the local database management component 323 for storage in the local database store 329 of the client device 320.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 9A illustrates one embodiment of a first logic flow 900. The logic flow 900 may be representative of some or all of the operations executed by one or more embodiments described herein.

In the illustrated embodiment shown in FIG. 9A, the logic flow 900 may receive a collection subscription command from a client device at a database synchronization system, the collection subscription command specifying an object collection at block 902.

The logic flow 900 may register the client device for push notification with a collection update queue associated with the object collection at block 904.

The logic flow 900 may detect a collection change for the object collection at block 906.

The logic flow 900 may add a collection update to the collection update queue, the collection update based on the collection change at block 908.

FIG. 9B illustrates one embodiment of a second logic flow 920. The logic flow 920 may be representative of some or all of the operations executed by one or more embodiments described herein.

In the illustrated embodiment shown in FIG. 9B, the logic flow 920 may send a collection subscription command from a client device to a database synchronization system, the collection subscription command specifying an object collection at block 922.

The logic flow 920 may receive a collection update from the database synchronization system based on the collection subscription command, the collection update for the object collection at block 924.

The logic flow 920 may update a local database store for the object collection on the client device using the collection update at block 926.

The logic flow 920 may send an update acknowledgement in response to the collection update based on the updating of the local database store for the object collection at block 928.

The embodiments are not limited to these examples.

Figure 10:
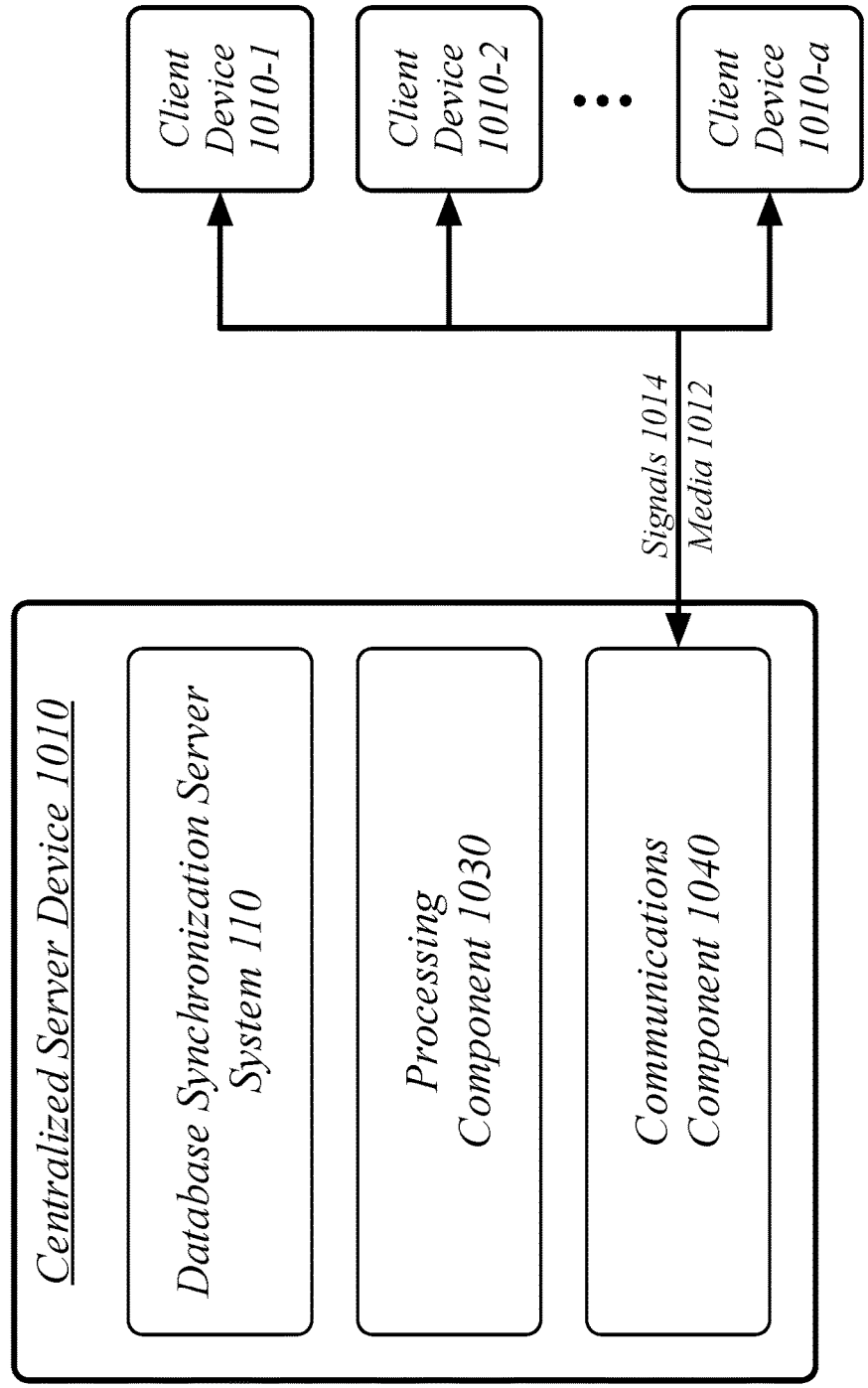
FIG. 10 illustrates an embodiment of a centralized system for the system of FIG. 1.

FIG. 10 illustrates a block diagram of a centralized system 1000. The centralized system 1000 may implement some or all of the structure and/or operations for the replicated database system 100 in a single computing entity, such as entirely within a single centralized server device 1010.

The centralized server device 1010 may comprise any electronic device capable of receiving, processing, and sending information for the replicated database system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 1010 may execute processing operations or logic for the replicated database system 100 using a processing component 1030. The processing component 1030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 1010 may execute communications operations or logic for the replicated database system 100 using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators).

The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1012 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 1010 may communicate with other devices over a communications media 1012 using communications signals 1014 via the communications component 1040. The devices may be internal or external to the centralized server device 1010 as desired for a given implementation.

The centralized server device 1010 may execute the database synchronization server system 110. The database synchronization server system 110 may include the server database management component 340, update queue management component 360, database query component 425, object collection store 330, and/or client device snapshot store 346. In some cases, the database synchronization server system 110 may include the changing device 420, such as where a collection change 410 is generated by a component of the database synchronization server system 110. The database synchronization server system 110 may communicate with one or more client devices 1010. The one or more client devices 1010 may correspond to, without limitation, a smartphone device 150, tablet device 160, personal computer device 180, client device 320, changing device 420, and/or any other client device.

Figure 11:
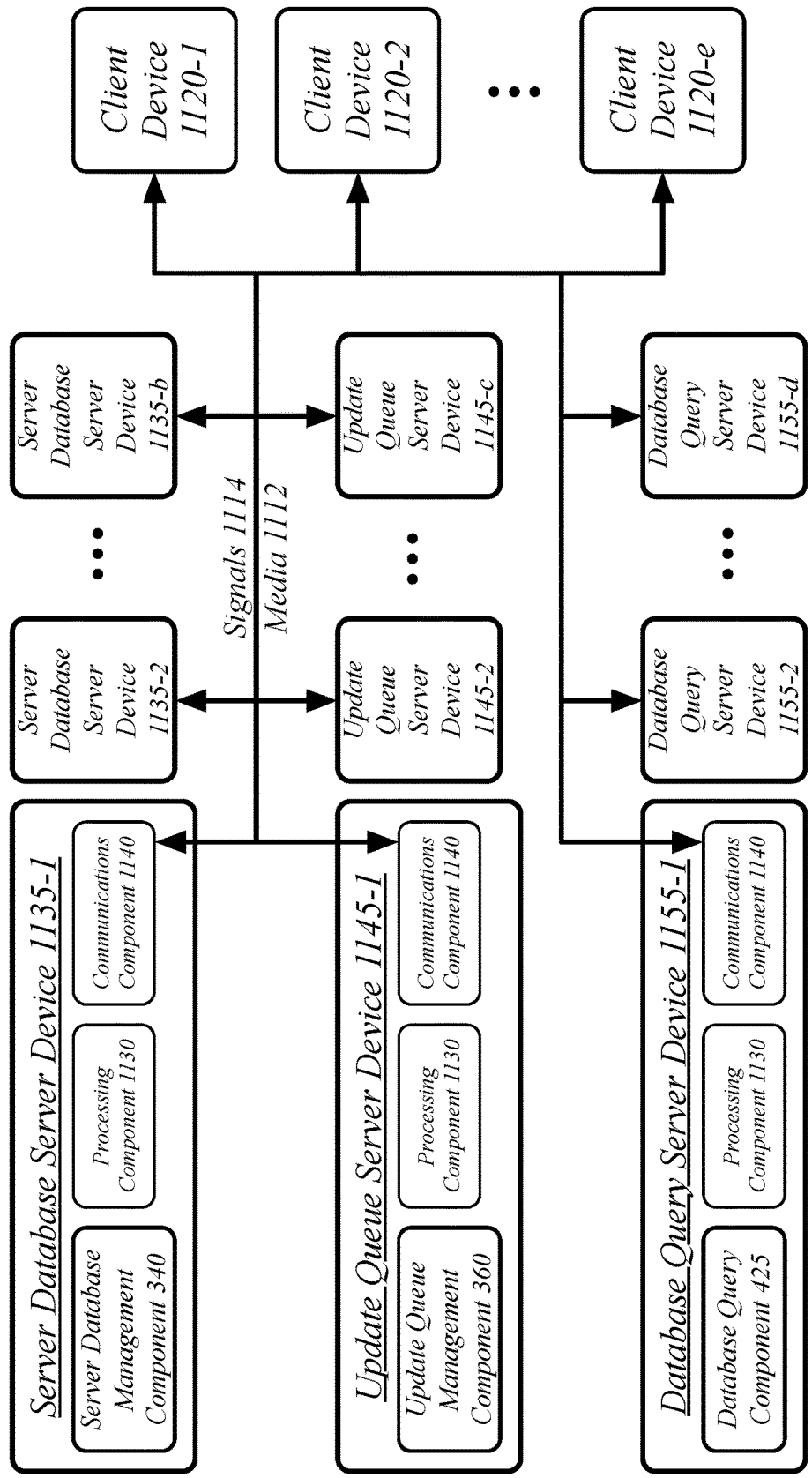
FIG. 11 illustrates an embodiment of a distributed system for the system of FIG. 1.

FIG. 11 illustrates a block diagram of a distributed system 1100. The distributed system 1100 may distribute portions of the structure and/or operations for the replicated database system 100 across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise a plurality of server devices. The distributed system 1100 may comprise one or more server database server devices 1135, update queue server devices 1145, and/or one or more database query server devices 1155. In general, the server devices 1135, 1145, 1155 may be the same or similar to the centralized server device 810 as described with reference to FIG. 10. For instance, the server devices 1135, 1145, 1155 may each comprise a processing component 1130 and a communications component 1140 which are the same or similar to the processing component 1030 and the communications component 1040, respectively, as described with reference to FIG. 10. In another example, the server devices 1135, 1145, 1155 may communicate over a communications media 1112 using communications signals 1114 via the communications components 1140.

The server database server devices 1135 may comprise or employ one or more server programs that operate to perform various methodologies in accordance with the described embodiments. In one embodiment, for example, the server database server devices 1135 may each implement a server database management component 340. The functions of the server database management component 340 may therefore be distributed across a plurality of server database server devices 1135.

The update queue server devices 1145 may comprise or employ one or more server programs that operate to perform various methodologies in accordance with the described embodiments. In one embodiment, for example, the update queue server devices 1145 may each implement an update queue management component 360. The functions of the update queue management component 360 may therefore be distributed across a plurality of update queue server devices 1145.

The database query server devices 1155 may comprise or employ one or more server programs that operate to perform various methodologies in accordance with the described embodiments. In one embodiment, for example, the database query server devices 1155 may each implement a database query component 425. The functions of the update queue management component 360 may therefore be distributed across a plurality of database query server devices 1155.

The server devices 1135, 1145, 1155 may perform server operations for one or more client devices 1120. The one or more client devices 1120 may correspond to, without limitation, a smartphone device 150, tablet device 160, personal computer device 180, client device 320, changing device 420, client devices 1010, and/or any other client device.

Figure 12:
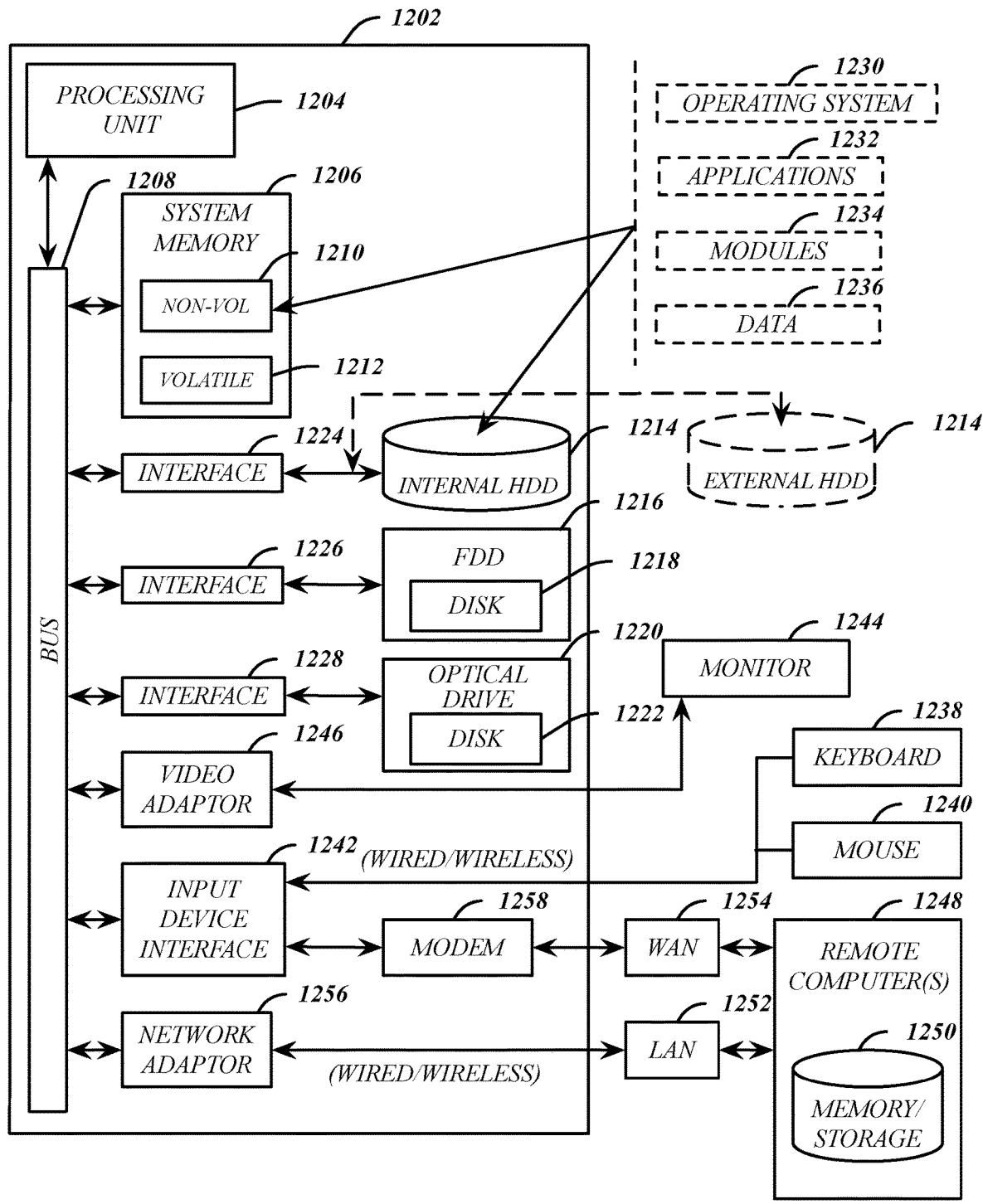
FIG. 12 illustrates an embodiment of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described with reference to FIG. 10, 11, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of the replicated database system 100.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.12 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.12x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
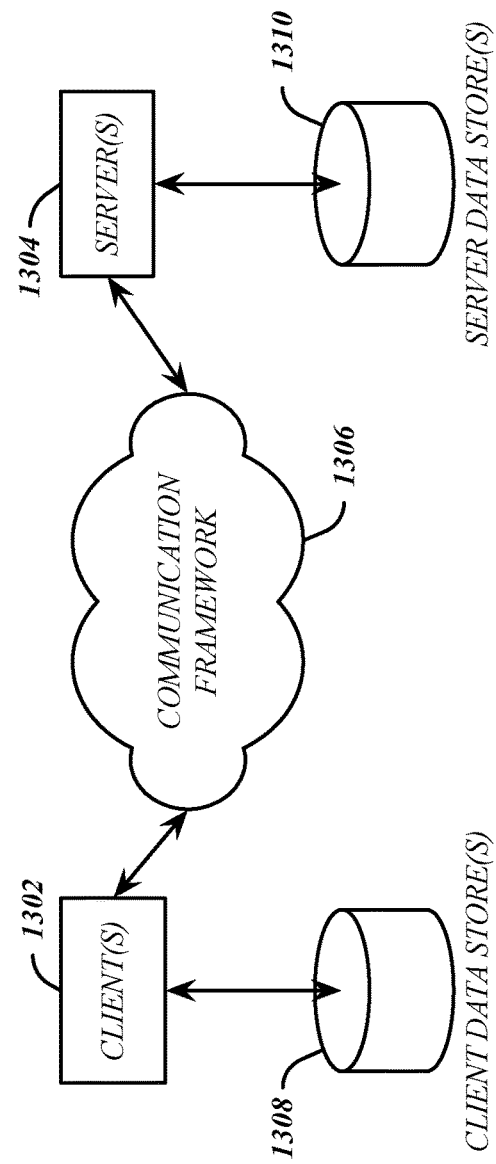
FIG. 13 illustrates an embodiment of a communications architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1302 and servers 1304. The clients 1302 may implement one or more client devices. Client devices may correspond to, without limitation, a smartphone device 150, tablet device 160, personal computer device 180, client device 320, changing device 420, client devices 1010, client devices 1120, and/or any other client device. The servers 1304 may implement the centralized server device 1010, server database server devices 1135, update queue server devices 1145, database query server devices 1155, and/or any other server devices. The clients 1302 and the servers 1304 are operatively connected to one or more respective client data stores 1308 and server data stores 1310 that can be employed to store information local to the respective clients 1302 and servers 1304, such as cookies and/or associated contextual information.

The clients 1302 and the servers 1304 may communicate information between each other using a communication framework 1306. The communications framework 1306 may implement any well-known communications techniques and protocols. The communications framework 1306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 14:
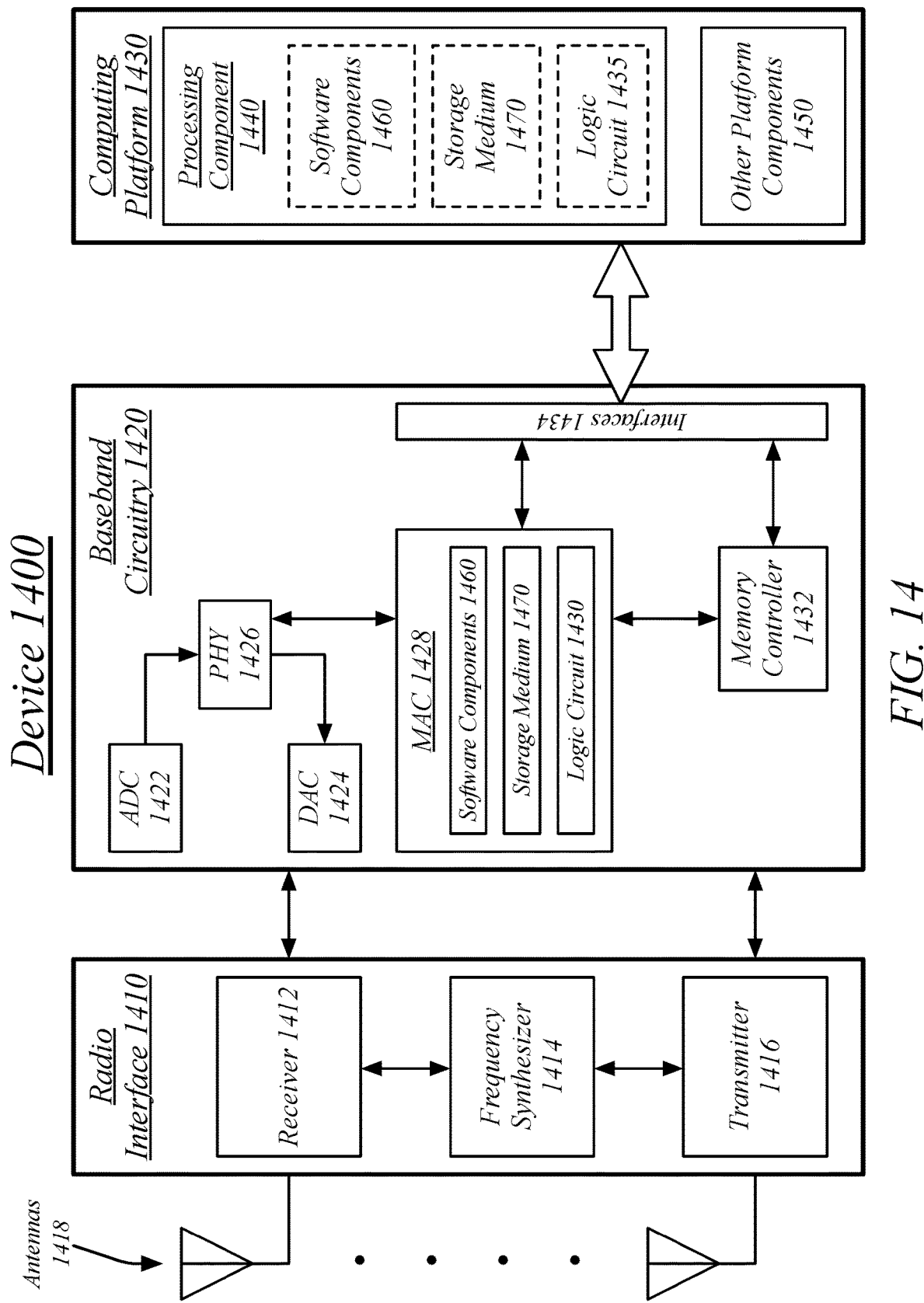
FIG. 14 illustrates an embodiment of a radio device architecture.

FIG. 14 illustrates an embodiment of a device 1400 for use in a multicarrier OFDM system, such as the replicated database system 100. Device 1400 may implement, for example, software components 1460 as described with reference to replicated database system 100 and/or a logic circuit 1435. The logic circuit 1435 may include physical circuits to perform operations described for the replicated database system 100. As shown in FIG. 14, device 1400 may include a radio interface 1410, baseband circuitry 1420, and computing platform 1430, although embodiments are not limited to this configuration.

The device 1400 may implement some or all of the structure and/or operations for the replicated database system 100 and/or logic circuit 1435 in a single computing entity, such as entirely within a single device. Alternatively, the device 1400 may distribute portions of the structure and/or operations for the replicated database system 100 and/or logic circuit 1435 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1410 may include, for example, a receiver 1412, a transmitter 1416 and/or a frequency synthesizer 1414. Radio interface 1410 may include bias controls, a crystal oscillator and/or one or more antennas 1418. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1456 for PHY link layer processing of respective receive/transmit signals. Baseband circuitry 1420 may include, for example, a processing circuit 1428 for medium access control (MAC)/data link layer processing. Baseband circuitry 1420 may include a memory controller 1432 for communicating with processing circuit 1428 and/or a computing platform 1430, for example, via one or more interfaces 1434.

In some embodiments, PHY processing circuit 1426 may include a frame construction and/or detection module, in combination with additional circuitry such as a buffer memory, to construct and/or deconstruct communication frames, such as radio frames. Alternatively or in addition, MAC processing circuit 1428 may share processing for certain of these functions or perform these processes independent of PHY processing circuit 1426. In some embodiments, MAC and PHY processing may be integrated into a single circuit.

The computing platform 1430 may provide computing functionality for the device 1400. As shown, the computing platform 1430 may include a processing component 1440. In addition to, or alternatively of, the baseband circuitry 1420, the device 1400 may execute processing operations or logic for the replicated database system 100 and logic circuit 1435 using the processing component 1440. The processing component 1440 (and/or PHY 1426 and/or MAC 1428) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired. In some embodiments, device 1400 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1400 may be implemented using single input single output (SISO) architectures. However, certain implementations may include multiple antennas (e.g., antennas 1418) for transmission and/or reception using adaptive antenna techniques for beamforming or spatial division multiple access (SDMA) and/or using MIMO communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a collection subscription command from a client device at a database synchronization system, the collection subscription command specifying an object collection; registering the client device for push notification with a collection update queue associated with the object collection; detecting a collection change for the object collection; and adding a collection update to the collection update queue, the collection update based on the collection change.

A computer-implemented method may further comprise the collection change modifying the object collection to an updated collection state, comprising: retrieving an object collection snapshot for the object collection; and generating the collection update based on a difference between the object collection snapshot and the updated collection state.

A computer-implemented method may further comprise the collection change modifying the object collection to an updated collection state, comprising: retrieving a client device snapshot for the client device; and generating the collection update based on a difference between the client device snapshot and the updated collection state.

A computer-implemented method may further comprise detecting that the client device has network accessibility with the database synchronization system; sending the collection update to the client device based on a push notification; and advancing a queue cursor for the client device past the collection update in the collection update queue.

A computer-implemented method may further comprise wherein a plurality of client devices are subscribed to the collection update queue.

A computer-implemented method may further comprise wherein two or more client devices of the plurality of client devices are associated with distinct user accounts for the database synchronization system.

A computer-implemented method may further comprise the object collection associated with a single user account, wherein other user accounts from the single user account are prevented from subscribing to the collection update queue for the object collection.

A computer-implemented method may further comprise receiving a collection unsubscription command from the client device at the database synchronization system, the collection unsubscription command specifying the object collection; and deregistering the client device for push notification with the collection update queue associated with the object collection in response to the collection unsubscription command.

A computer-implemented method may further comprise the object collection as user-read-only object collection.

A computer-implemented method may further comprise the object collection associated with system-side settings for the client device.

A computer-implemented method may further comprise determining that the object collection is a non-existing object collection; creating the object collection; and creating the collection update queue.

A computer-implemented method may further comprise retrieving an object collection snapshot for the object collection in response to the collection subscription command; and sending the object collection snapshot for the object collection to the client device.

A computer-implemented method may further comprise determining that a size for the object collection exceeds a predefined threshold; and generating the objection collection snapshot as a partial snapshot of the object collection in response to determining that the size for the object collection exceeds the predefined threshold.

A computer-implemented method may further comprise determining that the object collection is non-persisted in response to the collection subscription command; and sending an empty object collection snapshot for the object collection to the client device in response to determining that the object collection is non-persisted.

A computer-implemented method may further comprise receiving a collection update associated with the object collection via the collection update queue for the object collection; and updating an object collection store with the collection update.

A computer-implemented method may further comprise receiving the collection update from the client device; adding the collection update to the collection update queue for the object collection; and sending a collection update queuing acknowledgement to the client device in response to adding the collection update to the collection update queue for the object collection.

A computer-implemented method may further comprise sending a collection update storage acknowledgement to the client device in response to updating the object collection store with the collection update.

A computer-implemented method may further comprise the object collection comprising a query object, the query object associated with a database query for a database, further comprising: detecting the collection change for the object collection based on a performance of the database query against the database.

A computer-implemented method may further comprise performing the database query to generate an object collection snapshot for the object collection in response to the collection subscription command; and sending the object collection snapshot for the object collection to the client device.

A computer-implemented method may further comprise the database comprising a social graph for a social networking system.

An apparatus may comprise a processor circuit on a device; a server database management component operative on the processor circuit to receive a collection subscription command from a client device at a database synchronization system, the collection subscription command specifying an object collection; and detect a collection change for the object collection; and an update queue management component operative to register the client device for push notification with a collection update queue associated with the object collection; and add a collection update to the collection update queue, the collection update based on the collection change. The apparatus may be operative to implement any of the computer-implemented methods described herein.

A computer-implemented method may comprise sending a collection subscription command from a client device to a database synchronization system, the collection subscription command specifying an object collection; receiving a collection update from the database synchronization system based on the collection subscription command, the collection update for the object collection; updating a local database store for the object collection on the client device using the collection update; and sending an update acknowledgement in response to the collection update based on the updating of the local database store for the object collection.

A computer-implemented method may further comprise the database synchronization system comprising a database synchronization server system.

A computer-implemented method may further comprise the collection update received as a push notification from the database synchronization system.

A computer-implemented method may further comprise receiving an object collection snapshot from the database synchronization system in response to the collection subscription command; and storing the object collection snapshot in the local database store.

A computer-implemented method may further comprise performing an initial setup of an application on the client device; sending the collection subscription command as part of the initial setup, the object collection for the collection subscription command a preferences object collection for the application; receiving a preferences object collection snapshot in response to the collection subscription command; storing the preferences object collection snapshot in the local database store; and configuring the application according to the preferences object collection snapshot.

A computer-implemented method may further comprise the object collection storing a contact list for a user account with a messaging system, the collection update comprising a contact update for the contact list.

A computer-implemented method may further comprise the contact update comprising an updated profile picture.

A computer-implemented method may further comprise receiving a write command from an application on the client device, the write command specifying the object collection, the write command comprising an application object, a primary key for the application object, and a sort key for the application object; and storing the application object in the local database store in response to the write command, the local database store operative to retrieve the application object based on either of the primary key for the application object or the sort key for the application object.

A computer-implemented method may further comprise the application object stored in the local database store as a binary representation of the application object.

A computer-implemented method may further comprise the application object comprising a user-to-user message for a messaging system, the primary key comprising a message identifier for the user-to-user message, the sort key comprising a timestamp for the user-to-user message.

A computer-implemented method may further comprise detecting that the object collection lacks an existing object with the primary key in the local database store; and adding the application object to the local database store as an additional object associated with the object collection.

A computer-implemented method may further comprise detecting that the primary key corresponds to an existing object for the object collection in the local database store; and replacing the existing object with the application object for the object collection in the local database store.

A computer-implemented method may further comprise receiving a read command from an application on the client device, the read command specifying the object collection and a primary key, the primary key a unique identifier for an application object within a namespace for the object collection; retrieving the application object based on the primary key; and providing the application object to the application.

A computer-implemented method may further comprise receiving one or more read commands from an application on the client device, the one or more read commands specifying the object collection and a sort key, the sort key an ordering identifier for an application object within a namespace for the object collection, the one or more read commands specifying a quantity for retrieval; retrieving a plurality of application objects based on the sort key, an ordering defined by the plurality of assigned sort keys for the plurality of application objects, and the specified quantity; and providing the plurality of application objects to the application.

A computer-implemented method may further comprise the one or more read commands based on a cursor for the object collection.

A computer-implemented method may further comprise the collection update comprising a version vector, further comprising: updating a local database store for the object collection on the client device using the collection update based on the version vector.

A computer-implemented method may further comprise performing a periodic integrity check for the local database store with the database synchronization system.

A computer-implemented method may further comprise the periodic integrity check based on invertible Bloom filters.

An apparatus may comprise a processor circuit on a device; a local database management component operative on the processor circuit to send a collection subscription command from a client device to a database synchronization system, the collection subscription command specifying an object collection; and update a local database store for the object collection on the client device using a collection update; and a local queue component operative on the processor circuit to receive the collection update from the database synchronization system based on the collection subscription command, the collection update for the object collection; and send an update acknowledgement in response to the collection update based on the updating of the local database store for the object collection. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
   receiving a subscription command from a client device at a database synchronization server, the subscription command specifying a particular object collection for which the client device wishes to receive updates, wherein the object collection is a database:
   sending an object collection snapshot of the particular object collection to the client device, the object collection snapshot comprising a current state of the particular database:
   subscribing the client device to an update queue, the update queue associated exclusively with the particular object collection on the database synchronization server, the subscribing indicating that changes to the particular object collection received from other client devices and added to the update queue should be sent to the client device via push notification;
   receiving a change to the particular object collection from another client device;
   generating an update comprising the change;
   updating the database on the database synchronization server with the change;
   detecting that the client device has network accessibility with the database synchronization server;
   sending the collection update to the client device based on a push notification;
   advancing a queue cursor for the client device past the update in the update queue; and
   adding the update to the update queue for delivery to the subscribed client device.

2. The method of claim 1, further comprising:
   determining that the particular object collection is a non-existing object collection;
   creating the particular object collection; and
   creating the update queue.

3. The method of claim 1, further comprising:
   determining that the particular object collection is non-persisted in response to the collection subscription command; and
   sending an empty object collection snapshot for the particular object collection to the client device in response to determining that the particular object collection is non-persisted.

4. The method of claim 1, the particular object collection comprising a query object, the query object associated with a database query for the database, further comprising:
   detecting the change for the particular object collection based on a performance of the database query against the database.

5. An apparatus comprising:
   a processor circuit on a device;
   a server database management component operative on the processor circuit to:
   receive a subscription command from a client device at a database synchronization server, the subscription command specifying a particular object collection for which the client device wishes to receive updates, wherein the object collection is a database;

send an object collection snapshot of the particular object collection to the client device, the object collection snapshot comprising a current state of the particular database;

receive a change to the particular object collection from another client device; and update the database on the database synchronization server with the change; and an update queue management component operative to:

subscribe the client device to an update queue, the update queue associated exclusively with the particular object collection on the database synchronization server, the subscribing indicating that changes to the particular object collection added to the update queue should be sent to the client device via push notification;

generate an update comprising the change;

detect that the client device has network accessibility with the database synchronization server;

send the update to the client device based on a push notification;

advance a queue cursor for the client device past the update in the update queue; and add the update to the update queue for delivery to the subscribed client device.

6. The apparatus of claim 5, the particular object collection comprising a query object, the query object associated with a database query for the database, further comprising:

an update queue management component operative to:

detect the change for the particular object collection based on a performance of the database query against the database.

7. At least one non-transitory, computer-readable storage medium comprising instructions that, when executed, cause a system to:

receive a subscription command from a client device at a database synchronization server, the subscription command specifying particular object collection for which the client device wishes to receive updates, wherein the object collection is a database;

send an object collection snapshot of the particular object collection to the client device, the object collection snapshot comprising a current state of the particular database;

subscribing the client device to an update queue exclusively associated with the particular object collection on the database synchronization server, the subscribing indicating that changes to the particular object collection received from other client devices and added to the update queue should be sent to the client device via push notification;

receive a change to the particular object collection from another client device;

generate an update comprising the change;

update the database on the database synchronization server with the change;

detect that the client device has network accessibility with the database synchronization server;

send the collection update to the client device based on a push notification;

advance a queue cursor for the client device past the update in the update queue; and add the update to the update queue for delivery to the subscribed device.

8. The computer-readable storage medium of claim 7, comprising further instructions that, when executed, cause the system to:

receive an update associated with the particular object collection via the update queue for the particular object collection; and update an object collection store with the update.

9. The computer-readable storage medium of claim 7, the particular object collection comprising a query object, the query object associated with a database query for the database, comprising further instructions that, when executed, cause the system to:

detect the change for the particular object collection based on a performance of the database query against the database.

* * * * *